United States Patent [19]
Valus et al.

[11] Patent Number: 5,853,586
[45] Date of Patent: Dec. 29, 1998

[54] THIN PLIABLE POLYMERIC FILM FOR SEALING MICROPLATES

[75] Inventors: Ronald J. Valus, Valley View, Ohio; Jonathan N. Lipsky, Hanover, Mass.

[73] Assignee: Whatman, Inc., Mass.

[21] Appl. No.: 854,668

[22] Filed: May 12, 1997

Related U.S. Application Data

[62] Division of Ser. No. 714,760, Sep. 16, 1996, Pat. No. 5,665,247.

[51] Int. Cl.$^6$ ..................................................... G01N 1/14
[52] U.S. Cl. ..................... 210/406; 210/416.1; 210/455; 210/500.1; 422/101; 436/178
[58] Field of Search ..................................... 524/525, 526, 524/575.5; 525/235; 526/348, 348.1, 352; 215/341; 210/406, 416.1, 455, 500.1, 500.27, 500.42; 422/101; 436/178

[56] References Cited

U.S. PATENT DOCUMENTS 3,879,492  4/1975  Bontinick ................................. 524/525
4,927,604  5/1990  Mathus et al. ......................... 210/416.1

*Primary Examiner*—David A. Reifsnyder
*Attorney, Agent, or Firm*—Fay, Sharpe, Beall, Fagan, Minnich & McKee

[57] ABSTRACT

A sealing member for a multi-well microfiltration plate comprises a flexible sealing material which, in response to the application of differential pressure, will flex or collapse in the direction of the filtration along the contour of each individual well. A process maintains a differential pressure substantially constant over a multi-well microfiltration plate comprising placing said flexible sealing member over that surface of the plate having well openings, stretching the flexible sealing member so as to seal the perimeter of each individual well, creating a differential pressure around said plate covered with said seal and filtering a media from each occupied well at a rate independent of the filtration rate of any other well while maintaining a substantially constant differential pressure around the plate until filtration in the last well containing media is complete.

4 Claims, 1 Drawing Sheet

THIN PLIABLE POLYMERIC FILM FOR SEALING MICROPLATES

This is a divisional of application Ser. No. 08/714,760, filed Sep. 16, 1996, now U.S. Pat. No. 5,665,247.

BACKGROUND OF THE INVENTION

The invention is directed to the use of a thin, pliable film used for sealing the cell(s) of a microplate. More specifically, the invention is directed to an economical, simple and effective means of sealing a vacuum drawn or pressure forced microfilter plate which seals the cells thereof individually, thus allowing the filtration in each cell to proceed undisturbed by the status of filtration in other cells. The subject sealing means or system ensures that the vacuum or pressure level above or below the plate is not affected by completion of the filtration in one or more cells while other cells remain in the filtering status.

Microfiltration plates are fitted with membrane or depth filters and are intended to allow for the micro or ultrafiltration of multiple samples simultaneously. Generally, a vacuum is pulled under the plate, or pressure is applied over the plate, as a driving force for the filtration to be completed. An inherent problem with these devices is that not all wells within a single microplate, which may contain as many as 96 or more wells, filter at the same rate. This difference in filtration rate among wells of the same plate may be due to various parameters of the filtration set-up, such as the use of a defective membrane or other filter media in a particular well(s), a defective seal on the well(s), sample variances, and other differences in the individual wells or samples. Once all of the sample liquid has been removed from a well, air replacing the liquid and flowing through the filtration well alters the vacuum or pressure driving force retarding the rate of filtration in the remaining wells which continue to function or filter. Air breakthrough may also cause turbulence below the filter, enhancing the possibility of splashing and cross-contamination of liquid in the receiver reservoir(s).

Attempts to solve the foregoing problem have been varied. Many involve the use of different seal designs. Among them are the use of perforated polyester or cellophane tapes, and the use of a rigid or semi-rigid cap which fits the top of the plate. The main drawback to these types of seals is the rigidity thereof.

U.S. Pat. Nos. 5,464,541 and 5,462,878 describe prior art rigid seals. These devices prevent air breakthrough. However, they create another problem. As the liquid filters under the seals, a vacuum is created above the liquid. Every time the air gap above the filtering liquid doubles, the pressure driving force for filtration halves, causing an ever decreasing filtration rate. This effect is dramatically magnified as the amount of liquid placed in each well is increased. An alternative to a rigid cap seal on the microfiltration device is to individually seal each well as the liquid volume approaches the filter, a scenario which requires constant attention.

Therefore, if no sealing device is used, filtration efficiency of the entire microplate decreases rapidly once filtration of a first well or cell is completed and air breakthrough occurs. If a rigid sealing device is used to prevent air breakthrough, filtration efficiency of each well decreases at different rates, depending on the amount of liquid originally placed in each well and its filtration rate.

Other attempts to correct the seal problem described above include the use of a compliant, reusable sheet which does not seal the wells, but rather creates a bubble-point as all of the sample is drawn from a well, stopping filtration in that well. In this device, embodied in U.S. Pat. No. 4,927,604, no seal is created within the meaning of the current invention.

The use of a pliable polymeric film for sealing microplates solves both the air breakthrough and decreasing filtration rate problems discussed above.

It is therefore an object of the subject invention to provide a means for sealing a microfiltration device such that filtration of all wells therein proceeds to completion effectively and efficiently.

It is yet another object of the invention to provide a means for sealing individual wells within a multi-well filtration plate, as each well empties, so as not to disturb the filtration process taking place in the remaining wells.

It is another object of the invention to use a pliable polymeric film to seal the microplate as a whole and each well individually and prevent disturbance of the filtration process overall by collapse of the film into each well, at the particular filtration rate within each well, following the reduction in liquid level in the well, as the filtration process proceeds.

SUMMARY OF THE INVENTION

The invention relates to a sealing member for a multi-well microfiltration plate comprising a flexible sealing material which, in response to the application of differential pressure, will flex or collapse in the direction of the filtration along the contour of each individual well. The invention further relates to a process for maintaining a differential pressure substantially constant over a multi-well microfiltration plate comprising placing said flexible sealing member over that surface of the plate having well openings, stretching the flexible sealing member so as to seal the perimeter of each individual well, creating a differential pressure around said plate covered with said seal and filtering a media from each occupied well at a rate independent of the filtration rate of any other well while maintaining a substantially constant differential pressure around the plate until filtration in the last well containing media is complete.

DETAILED DESCRIPTION OF THE INVENTION

The invention relates to the use of a flexible seal to maintain the constant pressure driving force on a microfiltration or ultrafiltration plate. As the filtration process proceeds and the liquid level of each cell or well decreases, the flexible seal described herein depresses into the well or cell, following the liquid level. Thus, a vacuum is never created over the liquid and the driving force is never decreased or compromised, other than the force required to stretch the seal which is negligible. Filtration in all wells or cells is allowed to proceed individually, at its own rate, while a seal is maintained over each individual well or cell. Also, due to the individual sealing of each well, air breakthrough never occurs.

As used herein, the terms well and cell interchangeably refer to the individual filtration chambers of a multi-chamber micro- or ultra-filtration plate. Also, the term "microplate" as used herein refers to any multi-well filtration device, whether microfiltration, ultrafiltration, or other. Finally, the subject invention is equally applicable and well-suited for use in those instances where vacuum is drawn from below the plate to cause the filtration to occur, or pressure is applied above the plate to force the filtration process. This is intended to further include any device in which a centrifuge of or any other centrifugal device is used to effect filtration. In all instances, a pressure differential is being created across the film or the plate. Therefore, hereinafter, unless otherwise specified, use of the term "pressure differential" may refer to any of the above processes.

Figure 1:
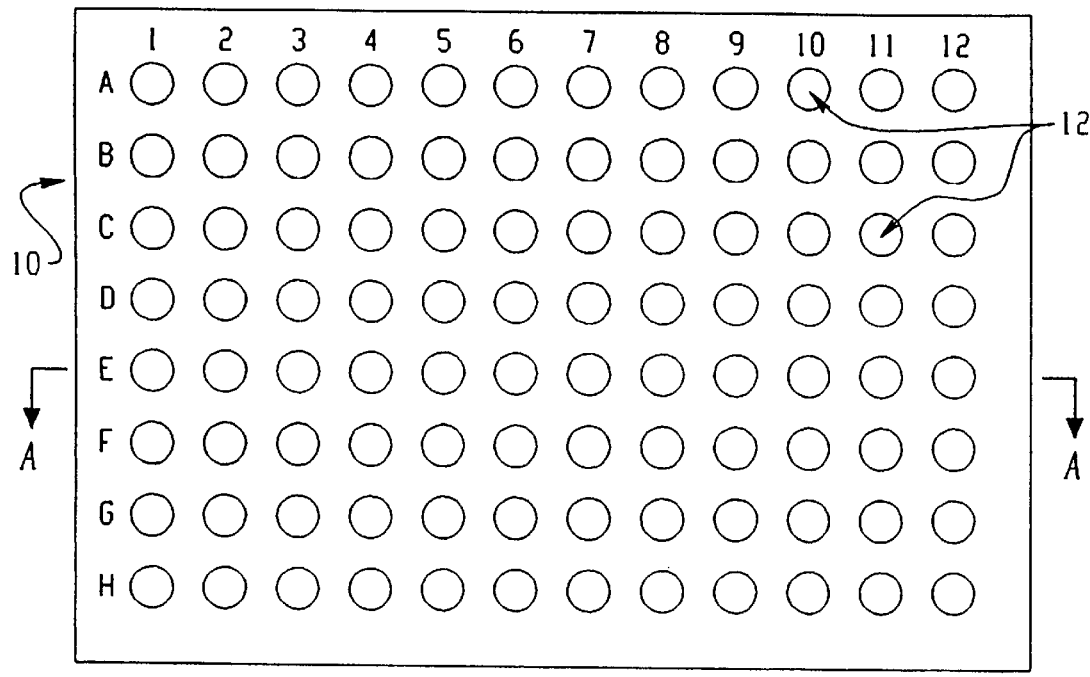
FIG. 1 is a plan view of a prior art microfiltration plate.

FIG. 1 is a plan view of a microfiltration plate 10, in this instance having ninety-six (96) wells 12 for filtering material. As is generally done, the wells are identified by rows and column for ease in sample identification.

Figure 2:
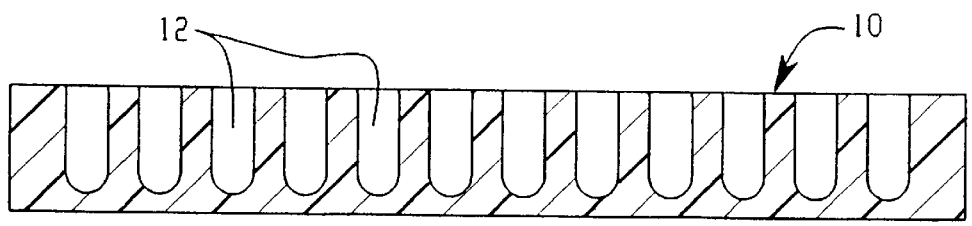
FIG. 2 is a cross-sectional view along lines A—A of the prior art microfiltration plate shown in FIG. 1.
Figure 3:
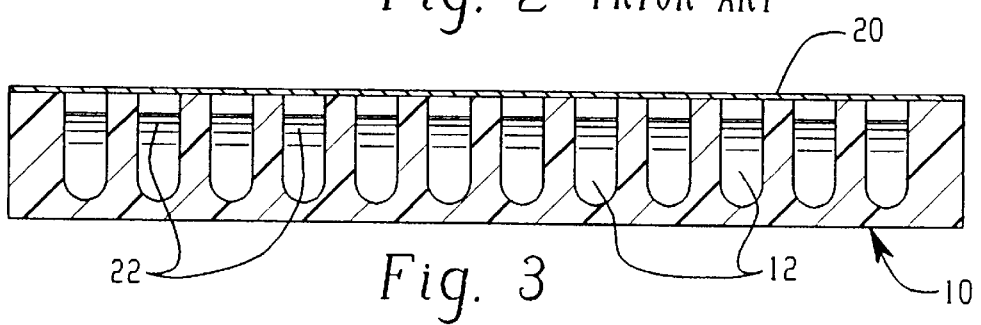
FIG. 3 is a cross-sectional view of a microfiltration plate with the inventive sealing cover in place, prior to use.
Figure 4:
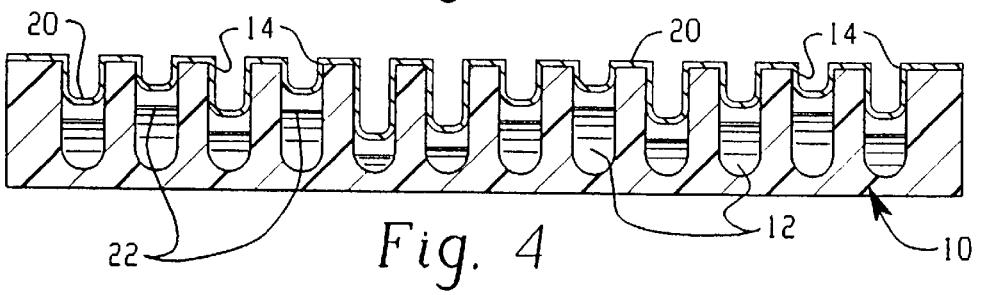
FIG. 4 is a cross-sectional view of a microfiltration plate with the inventive sealing cover during use in a filtration process.

FIGS. 2–4 are a cross-sectional view along lines A—A of FIG. 1. In FIG. 2, the wells 12 do not contain a material to be filtered. In FIG. 3, the microfiltration plate 10 is covered with a sealing member 20 in keeping with the invention. The wells 12 in FIG. 3 are shown containing a material to be filtered 22. FIG. 4 shows the microfiltration plate 10 of FIG. 3, bearing sealing member 20, during a filtration process. Sealing member 20 is shown to be collapsed in correlation to the filtration rate of each individual well 12, i.e., the sealing member 20 is collapsed to a different extent in each well in relation to the amount of material 22 remaining in the well. It is further noted that sealing member 20 is in sealing contact with the upper rim 14 of each well 12 during the filtration process to prevent air break-through.

Any number of known flexible materials may be used to create the flexible seal which is the subject hereof. In selecting an appropriate flexible seal material, it is important to ensure compatibility of the flexible seal material with the material/media being filtered. Further, the ability of the flexible material to stretch easily and be easily used with wells of varying sizes from plate to plate is important. If the material used to form the subject sealing means returns to its original shape upon relaxation of the filtration driving force, whether by employing a chemical treatment of the material or by employing a physical treatment of the material, such as heating, it may be appropriately cleaned and reused. Materials that do not or cannot be caused to return to their original shape may be used in disposable applications or scenarios. Suitable materials which meet the foregoing requirements of pliability, such as any natural or synthetic rubber, include latex, silicone rubber, and other elastomeric materials with similar properties, and further include other plasticized or unplasticized polymers such as polyvinylidine chloride, polyvinyl chloride, polyethylene, paraffin films, other suitable materials or blends thereof.

The sealing material may be affixed in a rigid perimeter frame device for ease in securing the sealing member to the microfiltration plate. In this embodiment, the sealing member would cover the tops of the wells of the plate and the frame would merely support the sealing member, allowing it to lay flat over the open ends of the wells and create a seal on each when a pressure differential is applied. The frame could optionally be used to effect an additional seal around the perimeter of the plate. This would hold the sealing means in constant position with respect to the plate as a whole, allowing for an individual seal to be achieved over each well opening.

Use of the subject seal provides yet another benefit in the area of microfiltration. Often times microfiltration plates are used in the biomedical sciences for testing highly sensitive samples, not only from the standpoint of the sample itself, but also from the standpoint of operator safety. Use of the subject sealing member affords maintenance of the sample in a non-contaminated state. Further, because air flow through the wells upon removal or filtration of the liquid sample does not occur, prior problems caused by the sample drying out are foregone.

EXAMPLES

Example I

Test solutions were pipetted into the individual wells of a Uniplate assembly. While it is not necessary to the proper function of the invention that all wells be filled, in this instance all were filled. A vacuum was applied to achieve filtration of the sample within the wells. A rubber latex sealing member, 0.010 inches thick, was then placed across the assembly. It was ascertained that all edges around each well were sealed. As filtration proceeded the process in all wells did not proceed at the same filtration rate. In those wells where the rate was faster, the rubber latex sealing member was observed to collapse into the well, individually, at the same rate at which the liquid was being filtered out of the well. No air breakthrough or other disturbance of the filtration rate/process in the individual wells was observed.

Example II

In this Example II, the Uniplate assembly was prepared just as in Example I with the exception that the sealing member was placed on the assembly prior to applying the vacuum. Filtration proceeded just as in Example I, with the filtration rate varying from well to well. The rubber latex sealing member was once again observed to collapse into each well individually at the same rate at which the liquid was filtered from the well. There was no breakthrough or other disturbance of the filtration rate/process in the wells.

As was stated hereinabove, the invention described herein is not only simple and cost effective, but it is also highly efficient and affords the operator greater freedom to monitor other aspects of the filtration process without the need to individually seal wells as they empty in order to maintain the desired pressure differential across the plate.

We claim:

1. A multi-well microfiltration device in combination with a sealing member, the sealing member comprising a flexible sealing material adapted to stretch across an upper surface of said multi-well microfiltration device, said microfiltration device comprising an upper surface having multiple well openings, each of said well openings having a perimeter on the upper surface of said microfiltration device, sidewalls extending downward from said perimeter, and a bottom surface such that a well for retaining a media to be filtered is formed, said flexible sealing member individually sealing said perimeter of each well opening and in response to the application of differential pressure, said flexible sealing member being capable of flexing or collapsing into each well, at a rate independent of the flexing or collapsing rate in any other well, so as to maintain a constant differential pressure around said device.

2. The sealing member according to claim 1 wherein said sealing member comprises a flexible sealing material selected from the group consisting of natural rubbers, synthetic rubbers, and plasticized and unplasticized polymeric materials.

3. The sealing member according to claim 1 wherein said sealing member comprises a flexible sealing material selected from the group consisting of latex, silicon rubber polyvinylidene chloride, polyvinyl chloride, polyethylene, paraffin films, and combinations thereof.

4. The sealing member according to claim 1 wherein said sealing member further includes a rigid frame into which said sealing member is affixed, said frame corresponding in size and shape to said perimeter of said multi-well microfiltration device, and being flexible thereto.

* * * * *